(12) United States Patent
Horikawa et al.

(10) Patent No.: US 9,950,615 B2
(45) Date of Patent: Apr. 24, 2018

(54) LID DEVICE

(71) Applicant: NIFCO INC., Yokosuka-shi, Kanagawa (JP)

(72) Inventors: Junpei Horikawa, Yokosuka (JP); Young-gook Lee, Yokosuka (JP)

(73) Assignee: NIFCO INC., Yokosuka-Shi, Kanagawa (JP)

( * ) Notice: Subject to any disclaimer, the term of this patent is extended or adjusted under 35 U.S.C. 154(b) by 0 days.

(21) Appl. No.: 15/306,651

(22) PCT Filed: Apr. 6, 2015

(86) PCT No.: PCT/JP2015/001934
§ 371 (c)(1),
(2) Date: Oct. 25, 2016

(87) PCT Pub. No.: WO2015/162861
PCT Pub. Date: Oct. 29, 2015

(65) Prior Publication Data
US 2017/0043660 A1 Feb. 16, 2017

(30) Foreign Application Priority Data
Apr. 25, 2014 (JP) .................. 2014-091841

(51) Int. Cl.
*E05C 7/06* (2006.01)
*B60K 15/05* (2006.01)
(Continued)

(52) U.S. Cl.
CPC .............. *B60K 15/05* (2013.01); *E05B 83/34* (2013.01); *E05F 1/105* (2013.01); *E05F 15/614* (2015.01);
(Continued)

(58) Field of Classification Search
CPC ............ B60K 15/05; B60K 2015/0538; B60K 2015/0561; B60K 2015/0576;
(Continued)

(56) References Cited

U.S. PATENT DOCUMENTS 5,178,265 A * 1/1993 Sepke .................... H01H 13/58
200/528
6,739,633 B2 5/2004 Holloway et al.
(Continued)

FOREIGN PATENT DOCUMENTS

| CN | 87204186 U | 6/1988 |
| CN | 87216345 U | 8/1988 |

(Continued)

OTHER PUBLICATIONS

PCT International Search Report of PCT/JP2015/001934 dated Jun. 23, 2015.
(Continued)

*Primary Examiner* — Jerry E Redman
(74) *Attorney, Agent, or Firm* — Manabu Kanesaka

(57) ABSTRACT

In a lid device opening and closing a fuel lid of a vehicle by a push-push mechanism, a common push lifter can be applied in both cases with and without a mechanism for locking the fuel lid at a closed position. The lid device (20) indirectly locks the fuel lid (10) at the closed position by controlling a displacement of a push rod (22) protruding and retracting from a push lifter unit (24). In order to control the displacement of the push rod (22), an engagement member (56) engaging the push rod (22) is movably supported in a housing (54) of a drive unit (26), and the push lifter (24) and the drive unit (26) are formed as separate members.

11 Claims, 10 Drawing Sheets

(51) Int. Cl.
 E05B 83/34 (2014.01)
 E05F 15/614 (2015.01)
 E05F 1/10 (2006.01)
(52) U.S. Cl.
 CPC ............... B60K 2015/0538 (2013.01); B60K 2015/0561 (2013.01); B60K 2015/0576 (2013.01); E05Y 2201/10 (2013.01); E05Y 2201/474 (2013.01); E05Y 2900/534 (2013.01)
(58) Field of Classification Search
 CPC ........ E05F 15/614; E05F 1/105; E05B 83/34; E05Y 2900/534; E05Y 2201/10; E05Y 2201/474
 USPC ........................................................ 292/97.22
 See application file for complete search history.

(56) References Cited

U.S. PATENT DOCUMENTS

| | | | | |
|---|---|---|---|---|
| 7,407,200 | B2 * | 8/2008 | Ichimaru | ............... E05B 83/30 292/194 |
| 8,845,001 | B2 * | 9/2014 | Kotama | ............ B60L 11/1818 296/97.22 |
| 9,359,796 | B2 * | 6/2016 | Betzen | .................... E05B 81/40 |
| 9,493,967 | B2 * | 11/2016 | Basavarajappa | ....... B60K 15/05 |
| 9,616,745 | B2 | 4/2017 | Beck | |
| 9,758,994 | B2 * | 9/2017 | Ito | ........................... E05B 83/34 |
| 2010/0045049 | A1 * | 2/2010 | Persiani | ................. B60K 15/05 292/14 |
| 2012/0222356 | A1 * | 9/2012 | Beck | ...................... B60K 15/05 49/348 |
| 2012/0242095 | A1 * | 9/2012 | Niwa | ..................... E05B 81/18 292/142 |
| 2012/0248792 | A1 * | 10/2012 | Ban | ......................... E05B 81/90 292/144 |
| 2017/0159331 | A1 | 6/2017 | Handke | |

FOREIGN PATENT DOCUMENTS

| | | | | |
|---|---|---|---|---|
| DE | 102012004078 A1 | | 9/2013 | |
| FR | 3001488 A1 | * | 8/2014 | ............ E05B 83/34 |
| GB | 2348922 A | | 10/2000 | |
| JP | 2010-006114 A | | 1/2010 | |
| JP | 2011-256528 A | | 12/2011 | |
| JP | 2016117313 A | * | 6/2016 | ............ B60K 15/05 |
| KR | 20150063922 A | * | 6/2015 | ............ B60K 15/05 |
| WO | 2004/041575 A1 | | 5/2004 | |
| WO | 2015/113545 A1 | | 8/2015 | |
| WO | WO 2015162861 A1 | * | 10/2015 | ............ B60K 15/05 |

OTHER PUBLICATIONS

Europe Patent Office, "Search Report for European Patent Application No. 15783827.7," dated Feb. 8, 2018.
China Patent Office, "Office Action for Chinese Patent Application No. 201580022512.0," dated Nov. 28, 2017.

* cited by examiner

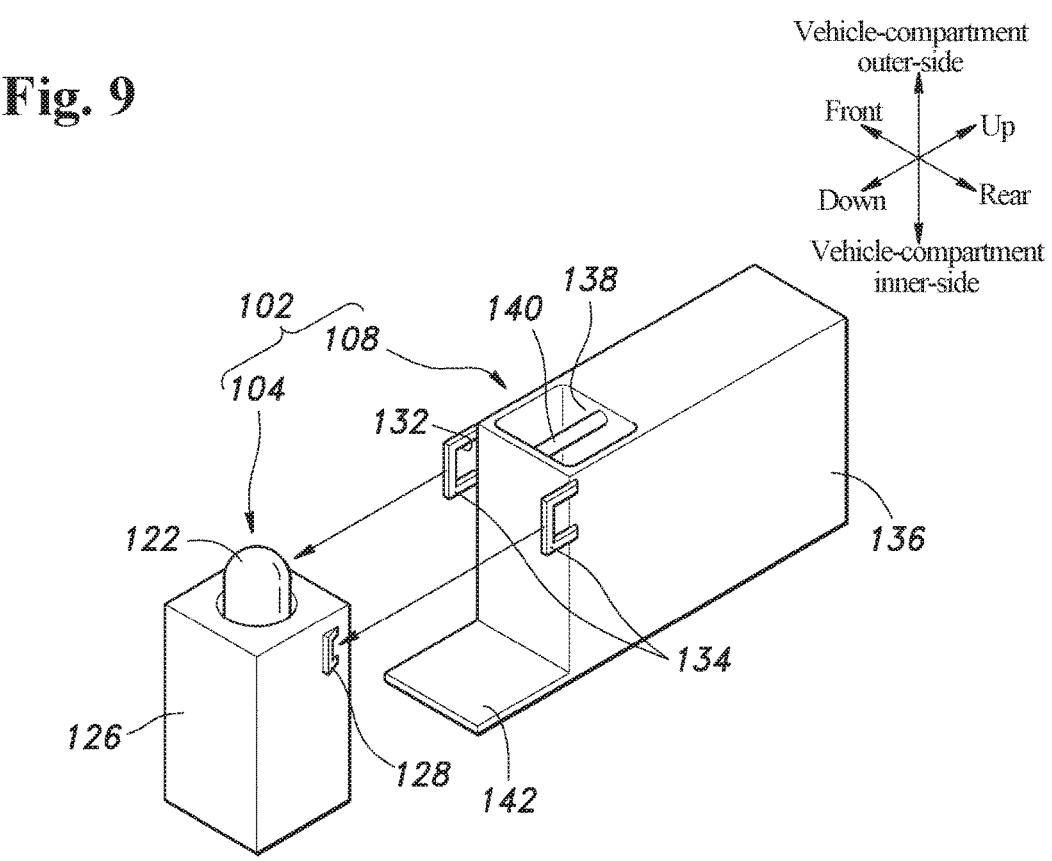

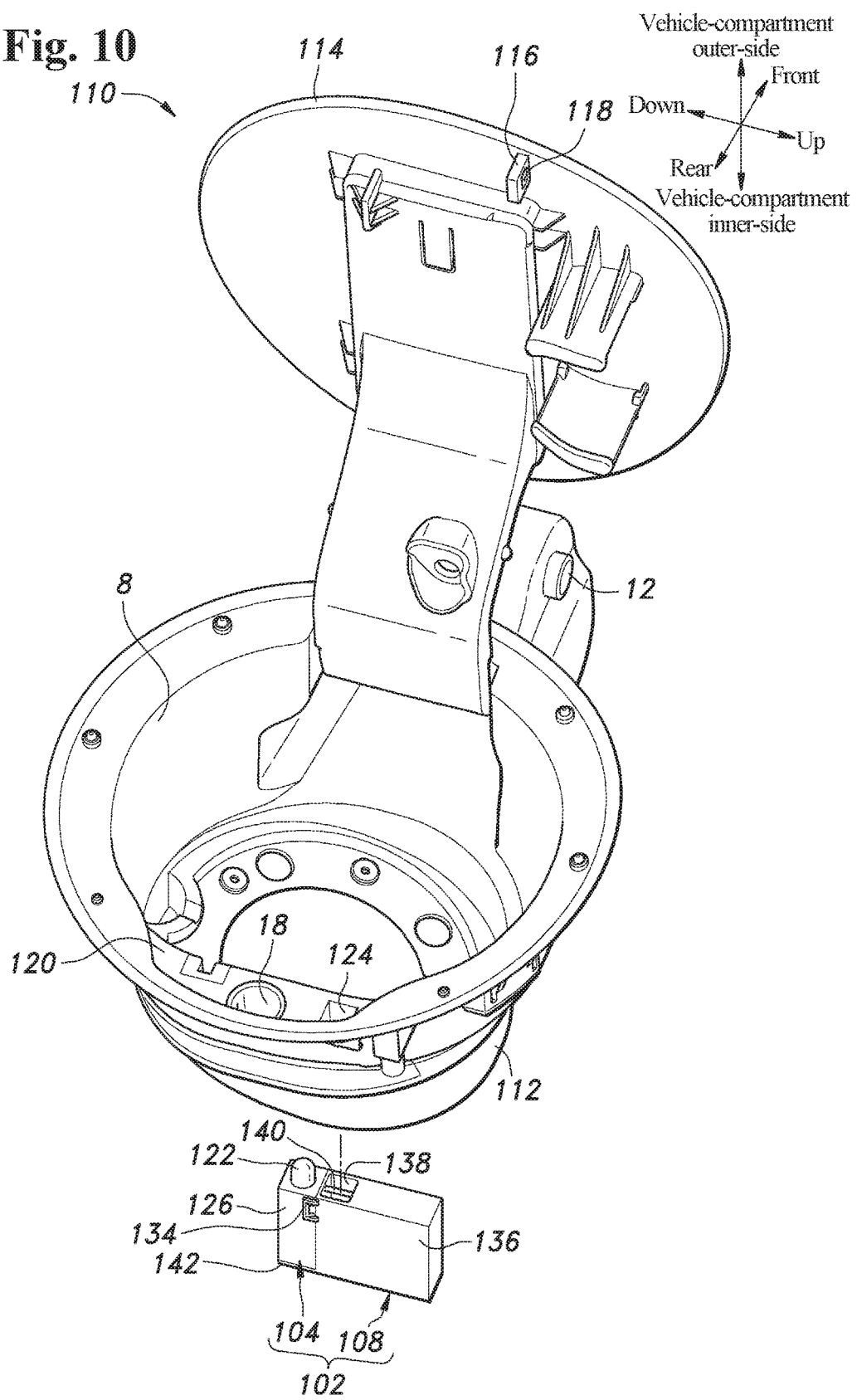

US 9,950,615 B2

LID DEVICE

CROSS-REFERENCES TO RELATED APPLICATIONS

The present application is National Phase of International Application No. PCT/JP2015/001934 filed Apr. 6, 2015, and claims priority from Japanese Patent Application No. 2014-091841, filed on Apr. 25, 2014, the disclosure of which is hereby incorporated by reference herein in its entirety.

FIELD OF TECHNOLOGY

The present invention relates to a lid device for opening and closing a lid pivotally supported turnably by so called a push-push mechanism. Especially, the present invention relates to a fuel lid device used to a fuel lid for opening and closing a fuel supply opening of a vehicle main member by a hinge.

BACKGROUND ART

The fuel lid (fuel filling aperture lid) opens and closes a fuel filling opening by the hinge, and is attached to a vehicle such that a surface thereof forms an outline of a body of the vehicle in a closed position. In the fuel filling opening, there is disposed a fuel filling aperture to which a cap can be attached. In order to prevent the fuel lid from opening unintentionally, there is a case wherein the fuel lid is designed in such a way as to be lockable at the closed position.

As for the fuel lid device for opening and closing the fuel lid by a push lifter including the push-push mechanism, with a lock function, for example, there are known devices described in Patent Documents 1 and 2. The device described in the Patent Document 1 includes a push lifter, and a fuel lid lock mechanism formed as a separate member relative to the push lifter and disposed in a separated position to lock a fuel lid. In the fuel lid lock mechanism, a main member is fixed to a back surface side of a wall covered by the fuel lid, and a lock pin reciprocally attached to the main member protrudes and retracts from a hole provided on the wall so as to engage and disengage with respect to a locking portion provided in the fuel lid to switch between locking and unlocking of the fuel lid. The device described in the Patent Document 2 comprises a push lifter locking the fuel lid at the closed position, and an electric lock mechanism locking a rod (pin) of the push lifter, and the push lifter and the electric lock mechanism are integrally formed to each other structurally and functionally. In the device of the Patent Document 1, the fuel lid is directly locked in the fuel lid lock mechanism, and in the device of the Patent Document 2, the electric lock mechanism prevents pushing of the push lifter, so that the fuel lid is indirectly locked. Consequently, even if a force pushing the fuel lid acts unintentionally, the fuel lid can be prevented from opening.

PRIOR ART DOCUMENTS

Patent Documents

Patent Document 1: Japanese Unexamined Patent Application Publication No. 2010-6114
Patent Document 2: U.S. Patent Application Publication No. 2010/0045049

SUMMARY OF THE INVENTION

Problems to be Solved by the Invention

In automobile consumers, however, there are some people preferring the lock function attached to the fuel lid, and some preferring without the lock function. Consequently, in order to respond to such demands, there is a case that automobile dealers provide the push lifter as a standard installation, and a device directly or indirectly locking the fuel lid located in the closed position as a maker's option. In the device described in the Patent Document 1, there are many workloads such that in a case wherein a lock device is not attached, it is necessary to close the hole allowing the lock pin to be inserted to pass; on the other hand, in a case wherein the lock device is attached, it is necessary to attach two assemblies respectively, and the like. Also, in the device described in the Patent Document 2, since the push lifter and the lock device are integrated, in the case wherein the lock device is not attached, it is necessary to separately provide the push lifter so as to obstruct the efficiency in an inventory management of components and the like.

The present invention is made in view of the aforementioned conventional technical problems, and an object of the present invention is to provide a lid device, which can use a common push lifter regardless of whether or not the lock device is attached, and be efficiently assembled in a case wherein the push lifter is provided as the standard installation, and the device directly or indirectly locking the fuel lid located in the closed position is provided as the dealer's option.

Means for Solving the Problems

One aspect of a lid device (20) according to the present invention is a lid device for pushing a lid (10), pivotally supported in a base member turnably between an open position and a closed position in such a way as to open and close an opening (8) provided in the base member (4), out in an open direction from the closed position. The lid member comprises a push lifter unit (24) including a first housing (28) provided on the base member side, a push rod (22) supported movably in an axial direction by the first housing, and a push-push mechanism (30) alternately displacing between a protruding position and a retracted position each time a push operation is carried out relative to the push rod; and a drive unit (26) including a second housing (54) provided on the base member side, an engagement member (56) movably supported in the second housing in such a way as to selectively engage relative to the push rod or the push-push mechanism in order to inhibit the push rod from moving in the axial direction at the closed position, and a drive mechanism (62) for driving the engagement member between an engagement position and a release position. The push lifter unit and the drive unit are formed as separate members from each other.

According to the structure, the engagement member for controlling the push operation relative to the push rod is supported in the second housing so as to allow the push lifter unit and the drive unit to be separate members from each other. Since both units are formed as separate members, the lid device can select whether or not a function for locking the lid at the closed position is included depending on presence/absence of the drive unit, and a common push lifter unit can be used. Also, compared to a structure directly locking the lid, in a structure that the engagement member engages the push rod, required member strength is low, so that the drive unit can be downsized, and can be easily assembled to a vehicle.

As for another aspect of the present invention, in the aforementioned structure, the engagement member engages a corresponding rod engagement portion (42) provided in the push rod in the engagement position. Also, as for another aspect of the present invention, the engagement member engages a cam (34) of the push-push mechanism in the engagement position.

According to the structure, with a simplified structure, the lid can be locked in the closed position.

As for another aspect of the present invention, in the aforementioned structure, in both housings of the first housing and the second housing, there is provided an attachment structure for fixing to each other. The attachment structure may include a locking claw (82) provided in one of the both housings, and a locked portion (84) provided in the other of the both housings to be locked in the locking claw.

According to the structure, the push lifter unit and the drive unit can be integrated, so that in a case of adding a lock function, the engagement member of the drive unit and a corresponding engagement portion corresponding to the engagement member thereof can be easily matched, and an attachment process of the lid device to a vehicle main member becomes easy. Moreover, in a case of providing the engagement claw and the locked portion, both units can be integrated without using tools so as to carry out an assembly operation easily and quickly.

As for another aspect of the present invention, in the aforementioned structure, the attachment structure comprises a pair of pinching pieces (48) provided in one of the both housings in such a way as to pinch the other of the both housings; and guide structures (78 and 80) provided between the pair of pinching pieces and corresponding portions of the other of the both housings in such a way as to guide the both housings in a direction of coming close to each other from a direction of intersecting relative to the axial direction, and the both housings are locked in an attachment position wherein the both housings come close to each other most.

According to the structure, the push lifter unit and the drive unit can be easily integrated, so that in the case of adding the lock function, the attachment operation of the lid device becomes easy. Also, in a state wherein both units are attached to each other, the guide structure controls a relative movement in the axial direction of the first housing and the second housing so as to prevent the push lifter unit from deviating in the axial direction relative to the drive unit by the push operation.

As for another aspect of the present invention, in the aforementioned structure, in a free end of the push rod, there is provided an engagement piece (36) to engage a corresponding lid engagement portion (16) on the lid side in the retracted position, and disengage from the corresponding lid engagement portion on the lid side in the protruding position, and in order to carry out an engagement/disengagement of the engagement piece and the corresponding lid engagement portion, the push-push mechanism is formed (38 and 40) in such a way as to displace the push rod between the protruding position and the retracted position, and simultaneously rotate the push rod around the axial direction.

According to the structure, regardless of the presence/absence of the drive unit, the lid can be locked in the closed position with a simple structure.

One aspect of the present invention is a lid device (110) for pushing a lid (114), pivotally supported in a base member turnably between an open position and a closed position in such a way as to open and close an opening (8) provided in the base member (112), out in an open direction from the closed position. The lid device comprises a push lifter unit (104) including a first housing (126) provided on the base member side, a push rod (122) supported movably in an axial direction by the first housing, and a push-push mechanism alternately displacing between a protruding position and a retracted position whenever a push operation is carried out relative to the push rod; and a drive unit including a second housing (136) attached to the push lifter unit, an engagement member (140) movably supported in the second housing in such a way as to selectively engage a corresponding lid engagement portion (116) on the lid side passing through a through hole (124) provided in the base member in the closed position, and a drive mechanism (62) for driving the engagement member between an engagement position and a release position. The push lifter unit and the drive unit are formed as separate members from each other.

According to the structure, regardless of whether or not the function for locking the lid is added, the common push lifter unit can be used, and as an option, when the function for locking the lid is added, the lock function can be easily added.

As for another aspect of the present invention, in the aforementioned structure, in place of the drive unit, there is included a dummy member unit (106) formed as a separate member relative to the push lifter unit, receiving the corresponding lid engagement portion passed through the through hole in the closed position, and attached to the push lifter unit in such a way as to close the through hole fluid-tightly.

According to the structure, in a case wherein the function for locking the lid is not added, the dummy member unit is used, so that there is no need for changing a structure for locking the lid provided in the base member and the lid, and the lid device can be easily attached to prevent rain water and the like from entering to a vehicle inside.

Effect of the Invention

According to the present invention, in the lid device, in a case wherein the push lifter unit is provided as a standard installation, and a drive device unit indirectly locking a fuel lid located in the closed position is provided as a dealers option, a common push lifter can be used regardless of whether or not a lock device is attached.

BRIEF DESCRIPTION OF THE DRAWINGS

FIG. 9 is a perspective view of the fuel lid device according to the second embodiment of the present invention (the drive unit is combined).

FIG. 10 is a perspective view of the fuel lid assembly wherein the fuel lid device is attached according to the second embodiment of the present invention (the drive unit is combined in the open position).

BEST MODES OF CARRYING OUT THE INVENTION

Figure 1:
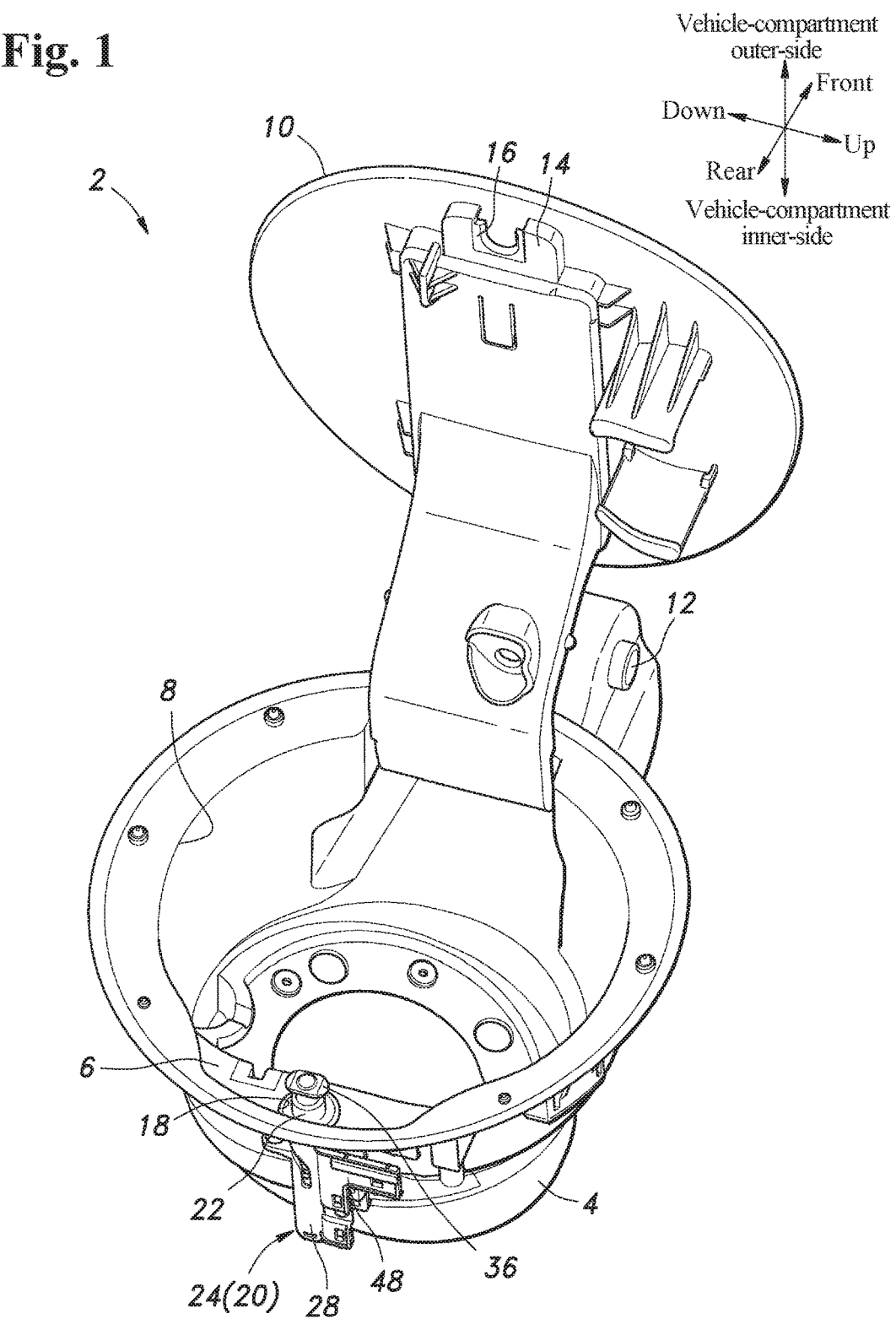
FIG. 1 is a perspective view of a fuel lid assembly wherein a fuel lid device is attached according to the first embodiment of the present invention (without a drive unit in an open position).

Hereinafter, an embodiment of the present invention will be explained with reference to the drawings. In an explanation, terms showing directions follow directions of a vehicle when a device is attached to the vehicle as shown in the drawings. FIGS. 1 to 4 are perspective views of a fuel lid assembly 2. Hereinafter, the fuel lid assembly 2 will be explained regarding the fuel lid assembly attached to a left side face of a rear portion of the vehicle (not shown in the drawings); however, the fuel lid assembly 2 may be attached to another position such as the rear portion of the vehicle, a right side face, and the like.

An opening-portion housing 4 forming a main outer shape of the fuel lid assembly 2 has a cup shape including an opening in a bottom portion, and a flange 6 is formed in a vehicle-compartment outer-side end portion on a wide diameter side. The opening-portion housing 4 is formed in such a way as to enter a fuel filling aperture communicating to a fuel tank inward from a vehicle-compartment inner-side end portion when the opening-portion housing 4 is attached to a vehicle body, and in the fuel filling aperture, there is attached a cap (not shown in the drawings). A fuel lid 10 opening and closing a fuel filling opening 8 formed on the vehicle-compartment outer-side end portion of the opening-portion housing 4 is made of a metal or resin material; is a member having an approximately disk shape; and is connected to the opening-portion housing 4 through a hinge 12. Incidentally, a shape of the fuel lid 10 may be another flat plate shape such as a rectangle and the like in place of a disk shape. The hinge 12 is disposed on a front side of the opening-portion housing 4, and a rotation shaft thereof faces in an up-and-down direction. The fuel lid 10 turns around the rotation shaft of the hinge 12 to open and close the fuel filling opening 8. A surface of the fuel lid 10 forms an outer outline of the vehicle body in a closed position wherein the fuel filling opening 8 is closed. Also, on a back surface near a free end side (a side opposite to a base end connected to the hinge 12) of the fuel lid 10, there is formed an enlarged portion 14 having a C shape, and an open end of the C shape faces the free end side. A locked plate 16 is formed in such a way as to face the back surface of the fuel lid 10 along an inner circumferential face of the C shape of the enlarged portion 14, and a slit having a U shape is formed from the free end side of the fuel lid 10. The flange 6 is disposed in such a way as to become approximately parallel to the fuel lid 10 located in the closed position, and a through hole 18 is provided in a position corresponding to the free end side of the fuel lid 10. A fuel lid device 20 is fixed in an outer circumferential face of the opening-portion housing 4 by a screw and the like such that the later-described push rod 22 is inserted into the through hole 18.

Figure 2:
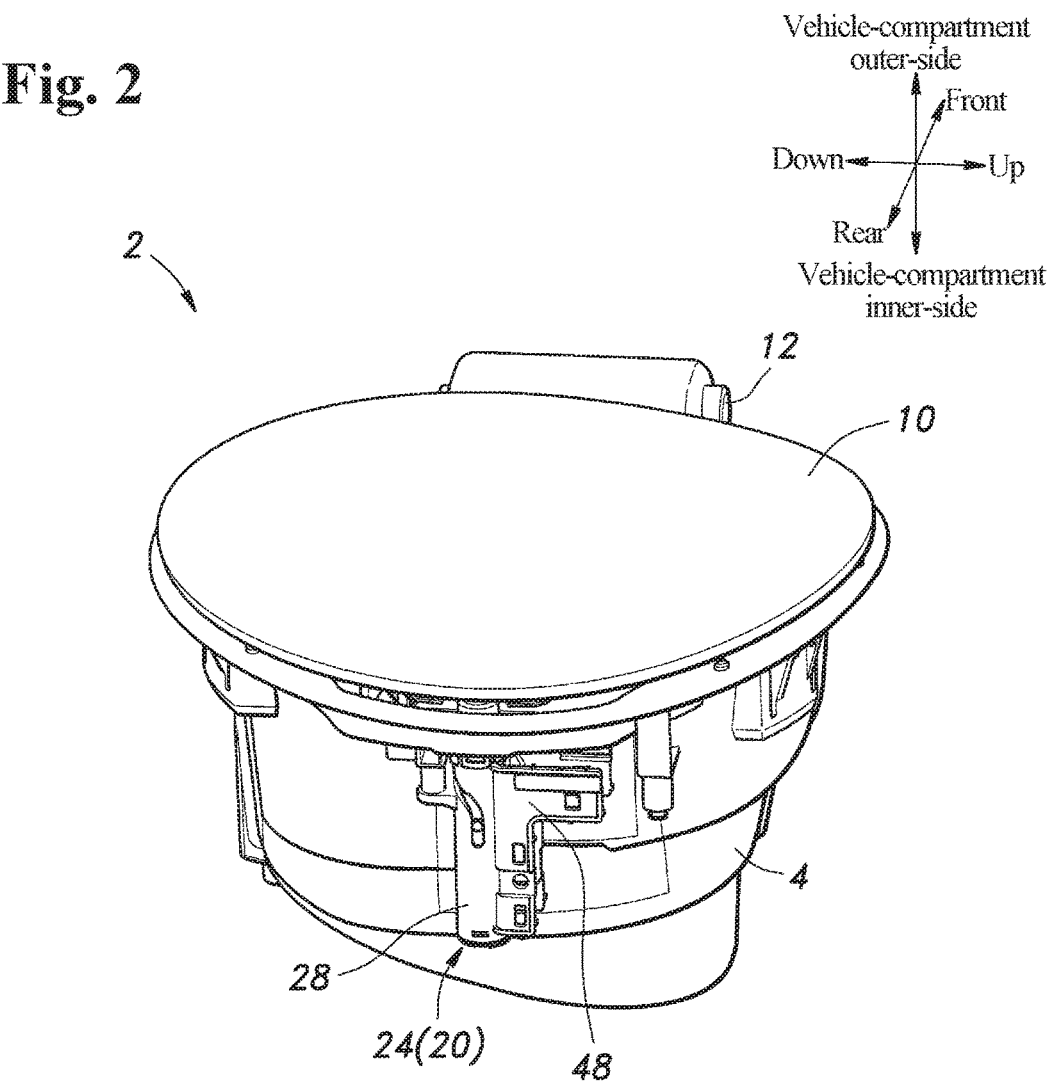
FIG. 2 is a perspective view of the fuel lid assembly wherein the fuel lid device is attached according to the first embodiment of the present invention (without the drive unit in a closed position).
Figure 3:
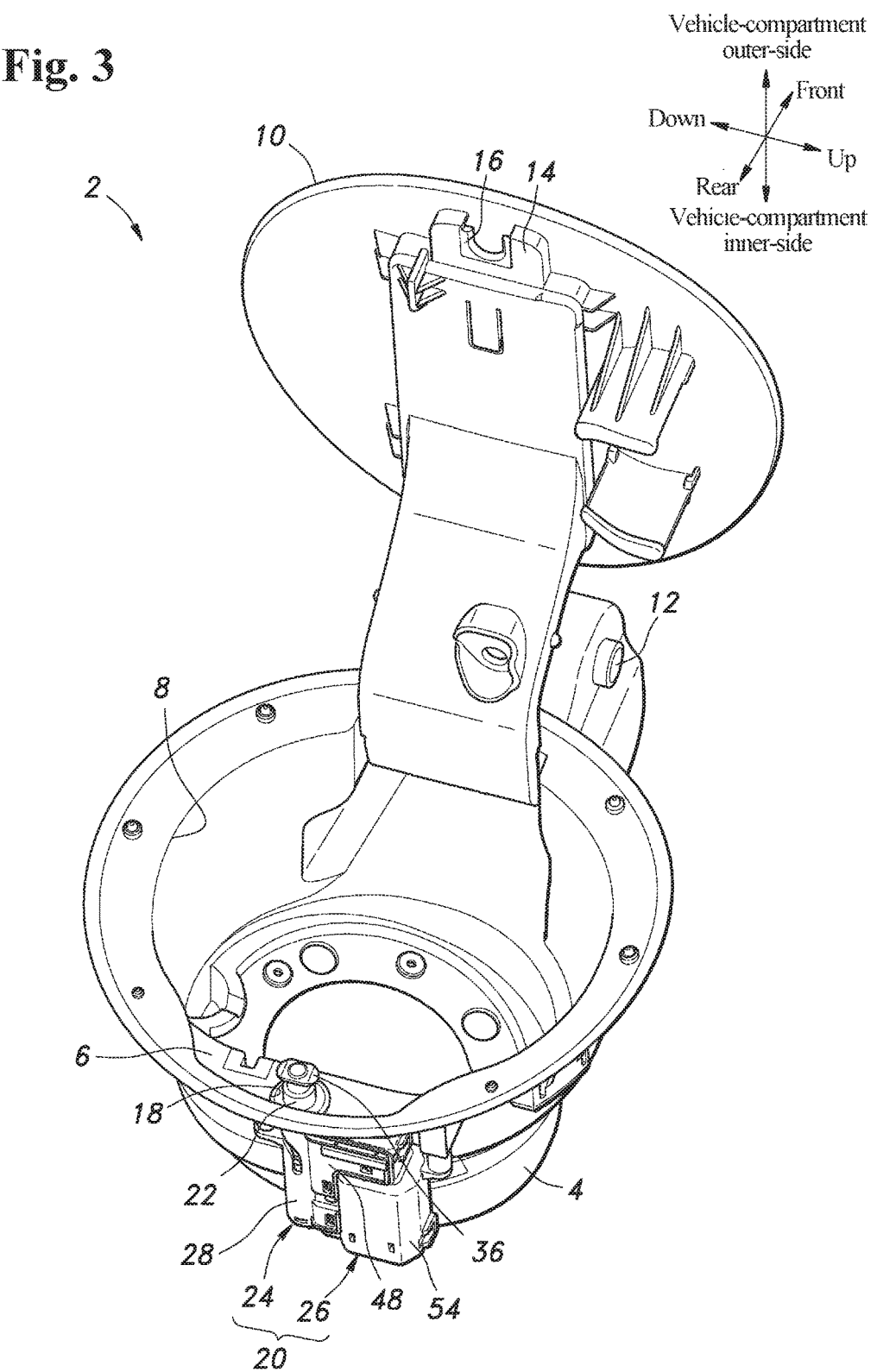
FIG. 3 is a perspective view of the fuel lid assembly wherein the fuel lid device is attached according to the first embodiment of the present invention (with the drive unit in the open position).
Figure 4:
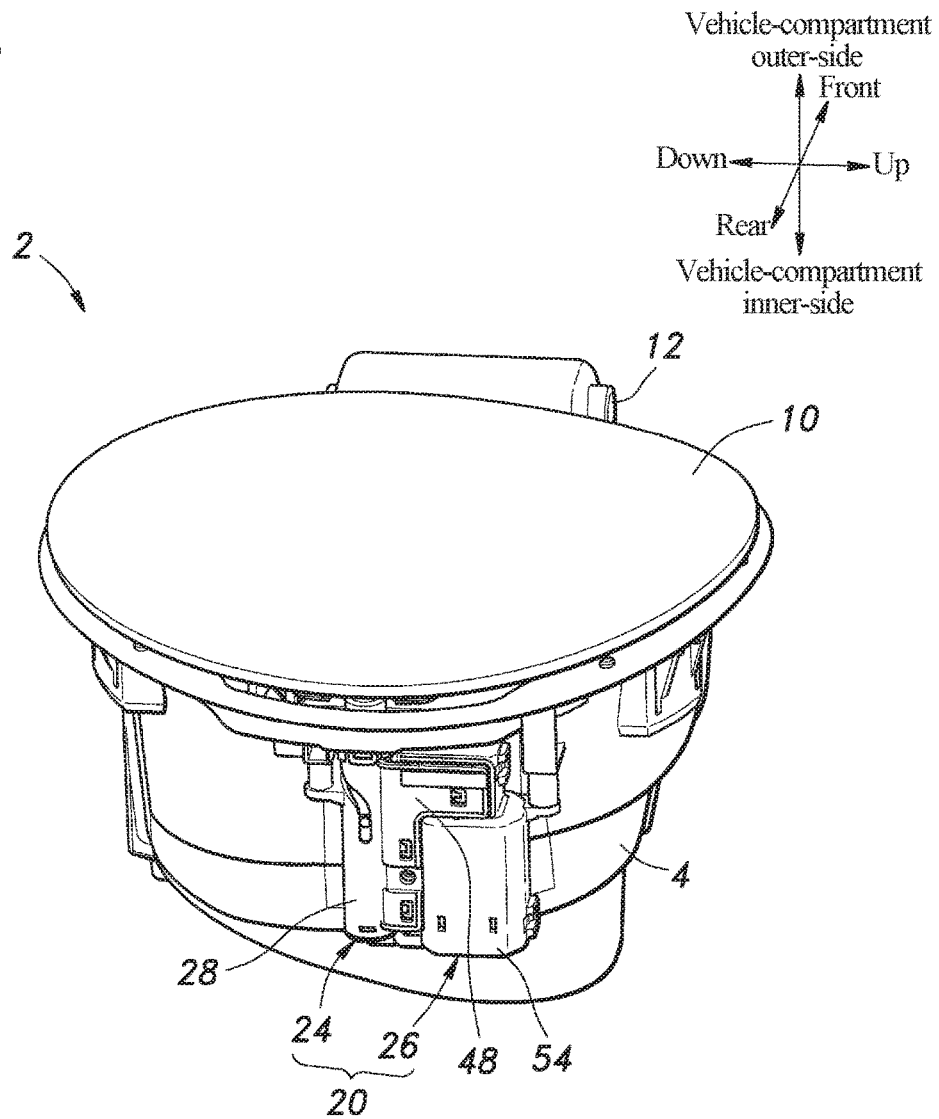
FIG. 4 is a perspective view of the fuel lid assembly wherein the fuel lid device is attached according to the first embodiment of the present invention (with the drive unit in the closed position).

The fuel lid device 20 may be formed by a single member of a push lifter unit 24 opening and closing the fuel lid 10 whenever the fuel lid 10 is pushed in (FIG. 1 and FIG. 2), and may be formed by a combination of the push lifter unit 24 and a drive unit 26 locking the fuel lid 10 in the closed position by controlling a push operation of the push rod 22 as well (FIG. 3 and FIG. 4).

Figure 5:
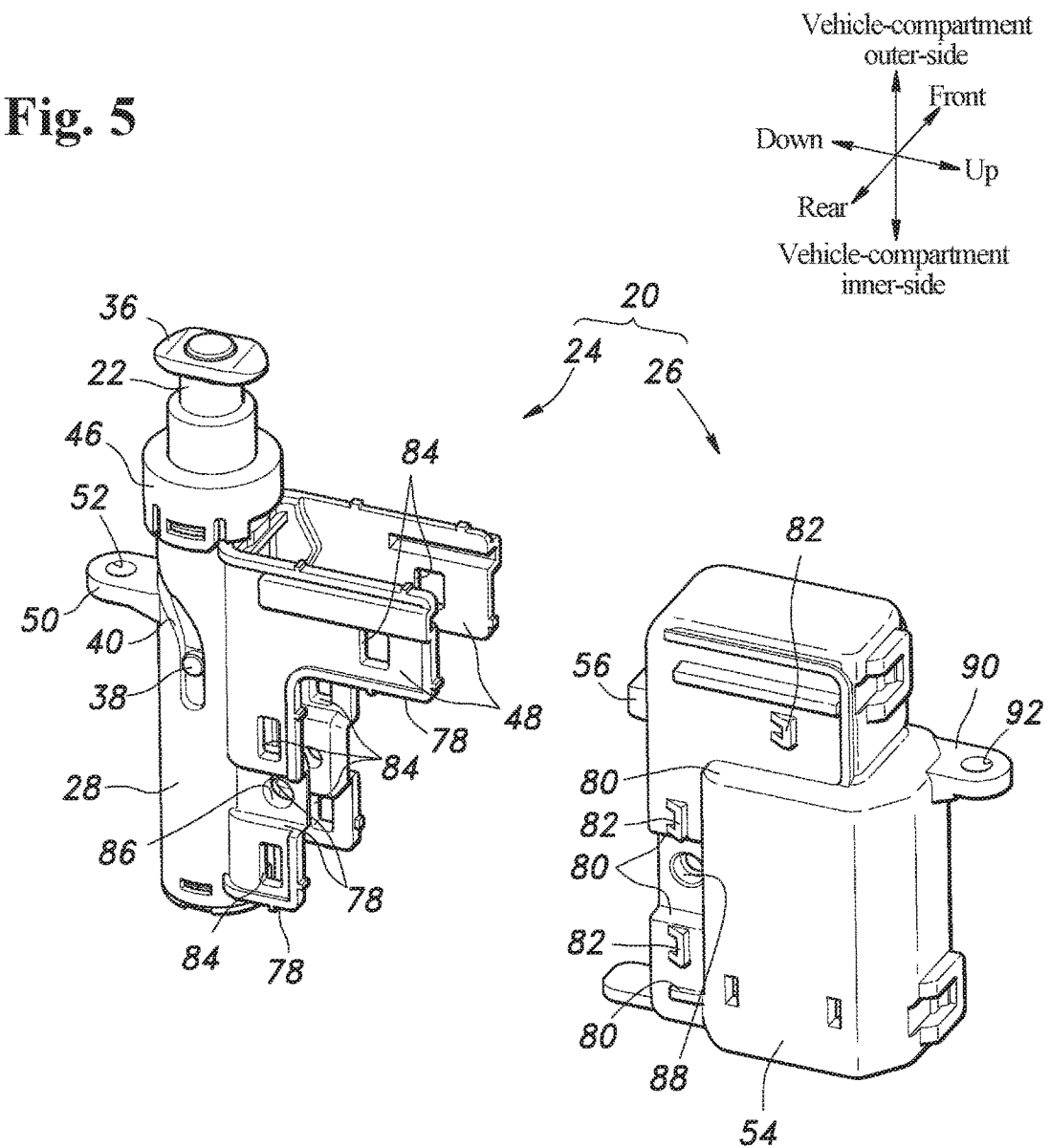
FIG. 5 is a perspective view of the fuel lid device according to the first embodiment of the present invention.
Figure 6:
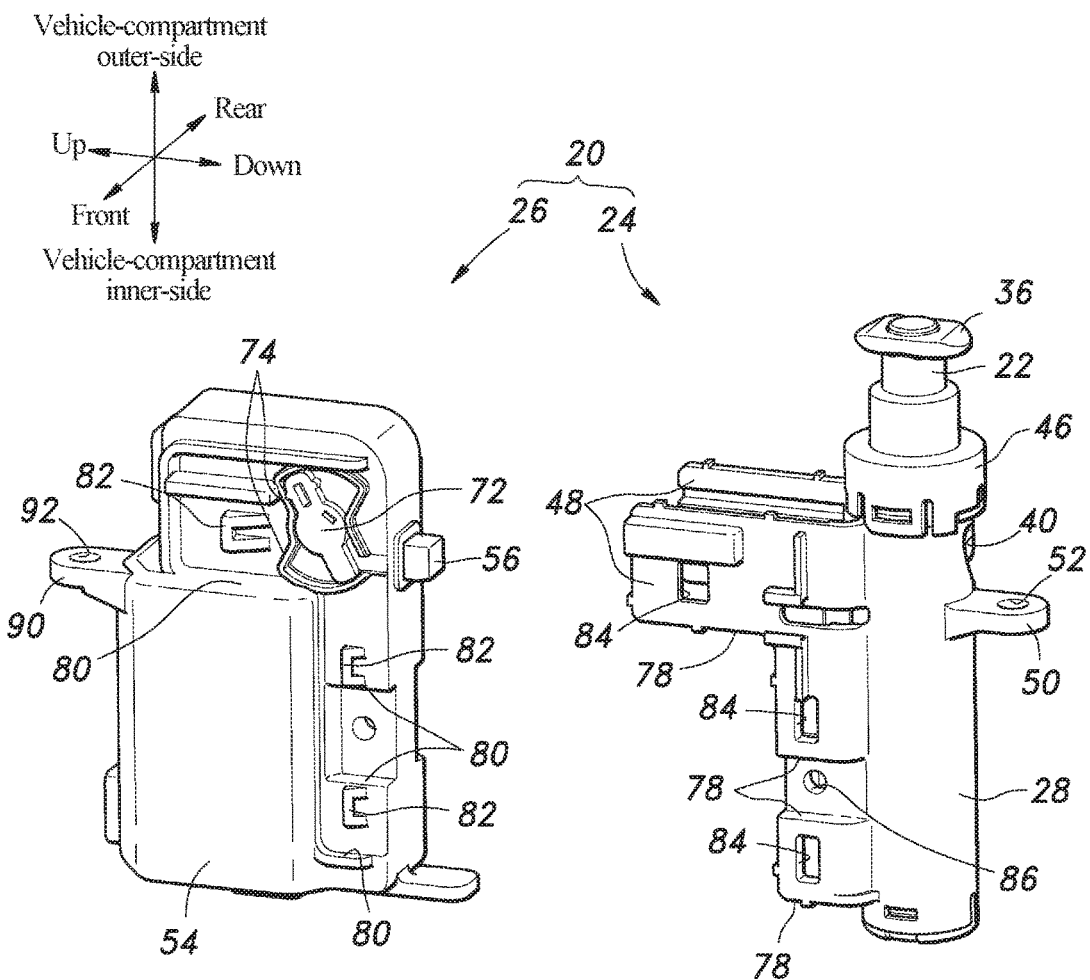
FIG. 6 a perspective view of the fuel lid device viewed from an angle different from FIG. 5 according to the first embodiment of the present invention.
Figure 7:
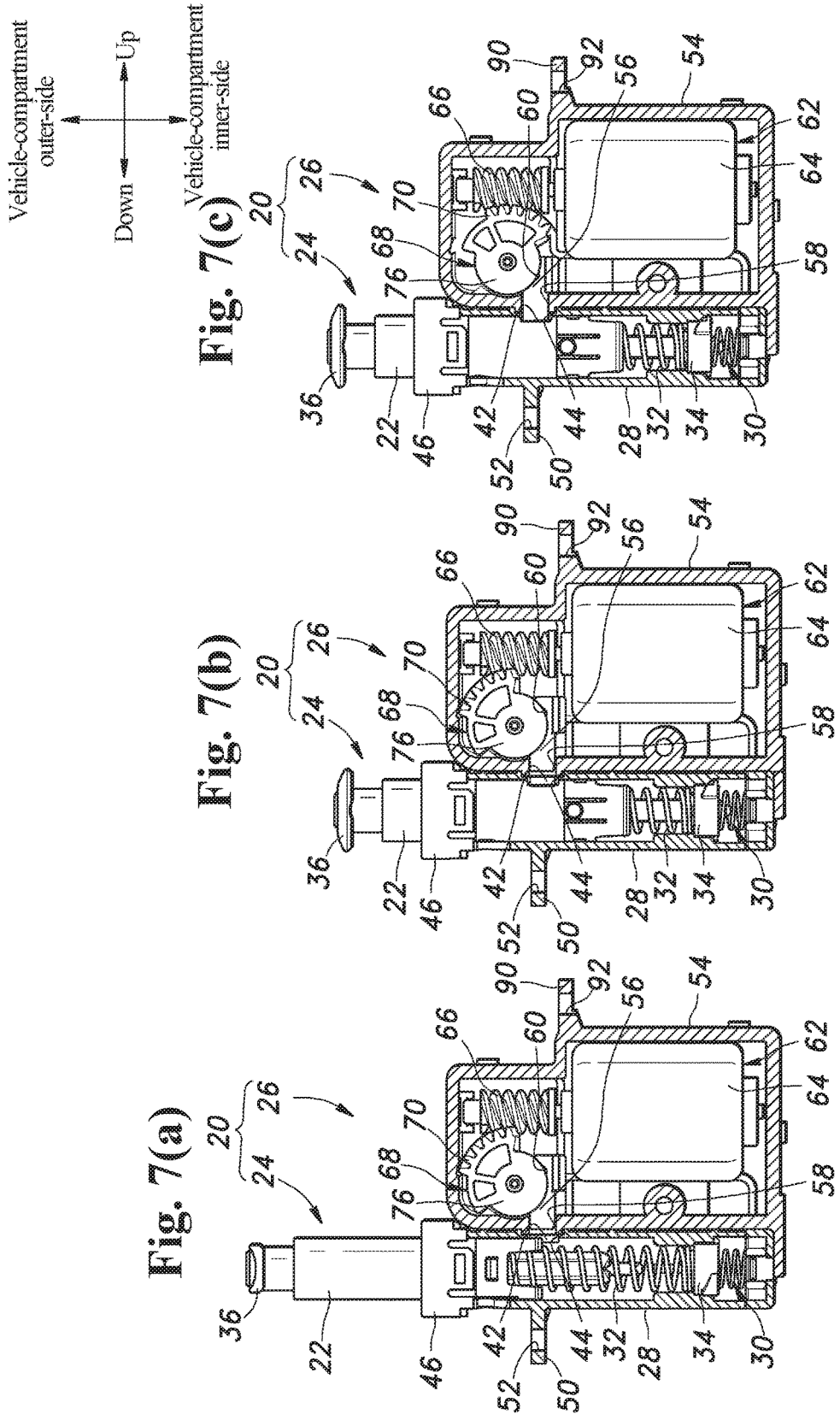
FIGS. 7(*a*), 7(*b*), and 7(*c*) are partially cross-sectional front views showing a non-lock state and a lock state of the fuel lid device according to the first embodiment of the present invention.

FIG. 5 is a perspective view showing the push lifter unit 24 and the drive unit 26 in a separated state, and FIG. 6 is a perspective view seen from an approximately opposite side of FIG. 5. FIGS. 7(*a*), 7(*b*), and 7(*c*) are drawings showing an internal structure in a state wherein the push lifter unit 24 and the drive unit 26 are combined.

The push rod 22 which is a structure element of the push lifter unit 24 is a molded article made of a resin material, and has roughly a column shape or cylinder shape. An axial direction (a longitudinal direction) thereof is arranged in such a way as to face a vehicle compartment inner and outer direction. A first housing 28 receiving the push rod 22 and supporting movably in the axial direction thereof has roughly a cylindrical shape, and is a molded article made of the resin material. The push lifter unit 24 comprises a push-push mechanism 30 alternately displacing between a protruding position wherein a free end side of the push rod 22 largely protrudes from the first housing 28 by moving the push rod 22 to a vehicle compartment outer side each time the push operation is carried out relative to the push rod 22; and a retracted position wherein the most of the push rod 22 is retracted in the first housing 28 by moving the push rod 22 to a vehicle compartment inner side. In the push-push mechanism 30, a function allowing the push rod 22 to protrude and retract by the push operation can be provided by applying a known mechanism, for example, as shown in FIGS. 7(*a*), 7(*b*), and 7(*c*), and the mechanism is formed by a compression coil spring 32 housed inside the first housing 28 and urging the push rod 22 toward the protruding position, a cam 34 rotated by the push operation, a shape of an inner circumferential face of the first housing 28 engaging the cam 34, and the like.

In the push rod 22, a base end side facing the vehicle compartment inner side abuts against the compression coil spring 32, and the free end side facing the vehicle compartment inner side protrudes from the first housing 28. In a free end of the push rod 22, there is provided a locking piece 36 providing a plate shape having an oval shape or a truck shape viewed from the axial direction. A short diameter of the locking piece 36 approximately corresponds to a diameter on the free end side of the push rod 22 near the locking piece 36. Therefore, a long diameter direction of the locking piece 36 extends in a radial direction from the free end of the push rod 22. On an outer circumferential side face of the push rod 22, there is provided a projection 38 such that the locking piece 36 rotates at approximately 90 degrees around an axis line when the push rod 22 moves from the protruding position to the retracted position, and the locking piece 36 rotates at approximately 90 degrees in an opposite direction around the axis line when the push rod 22 moves from the retracted position to the protruding position. Also, in the first housing 28, there is provided a long hole 40 receiving the projection 38 for guiding. The long hole 40 extends in the axial direction, and is curved in such a way as to deviate at approximately 90 degrees toward a circumferential direction as moving toward the axial direction. The push rod 22 rotates, so that the locking piece 36 engages with and disengages from the locked plate 16 of the fuel lid 10.

Also, on the outer circumferential side face of the push rod 22, there is provided a concave portion 42. Moreover, on a circumferential wall of the first housing 28, there is provided a through hole 44 matching to the concave portion 42 when the push rod 22 is located in the retracted position. An engagement member 56 of the later-described drive unit 26 engages the concave portion 42 through the through hole 44 so as to control a movement in the axial direction of the push rod 22, so that the push operation relative to the push rod 22 becomes unable to be carried out.

The push lifter unit 24 is further attached coaxially to a vehicle-compartment outer-side end portion of the first housing 28, and comprises a ring cover 46 movably fitting the push rod 22. The ring cover 46 is a molded article made of the resin material, and has roughly a ring shape. Inside the ring cover 46, there is attached an O-ring (not shown in the drawings) to seal a portion sliding the push rod 22. Also, an outer diameter of the ring cover 46 corresponds to an inner diameter of the through hole 18 of the flange 6, and the fuel lid device 20 is attached to the opening-portion housing 4 such that the ring cover 46 fits in the through hole 18.

The push lifter unit 24 further comprises a pair of pinching pieces 48 extending parallel to each other by sandwiching the through hole 44 from an outer circumferential side face of the first housing 28. An extension direction is parallel to a radial direction toward the through hole 44 from the axis line of the push rod 22. The pair of pinching pieces 48 performs a function for fixing the push lifer unit 24 and the drive unit 26 to each other. Also, the push lifter unit 24 comprises a projecting piece 50 protruding to a side opposite to the pair of pinching pieces 48 on the outer circumferential side face of the first housing 28, and the projecting piece 50 includes a screw hole 52, and is used for fixing the push lifter unit 24 to the opening-portion housing 4 by the screw.

The drive unit 26 is formed as a separate member from the push lifter unit 24, and is a component for locking the fuel lid 10 at the closed position by engaging the push rod 22 located in the retracted position, and controlling the push operation. A second housing 54 forming a main outer outline of the drive unit 26 is a molded article made of the resin material, and has an outer shape wherein an approximately rectangular parallelepiped shape is deformed corresponding to a shape of a stored article.

The engagement member 56 is a molded article made of the resin material; has an approximately square column shape; is disposed such that a longitudinal direction intersects in the axial direction of the push rod 22; and is slidably supported in the second housing 54 along the longitudinal direction. The engagement member 56 is housed in the second housing 54 such that one end side protrudes and retracts from a through hole 58 provided in the second housing 54 by sliding the second housing 54. The engagement member 56 is disposed such that in an engagement position protruding from the second housing 54, one protruding end side passes through the through hole 44 of the first housing 28 to engage the concave portion 42 of the push rod 22 located in the retracted position; and in a release position retracted in the second housing 54, one end side thereof is disengaged from the concave portion 42. On the other end side of the engagement member 56, there is formed a through hole 60 intersecting in the longitudinal direction itself and in the axial direction of the push rod 22.

Also, the second housing 54 houses a drive mechanism 62 for driving the engagement member 56 between the engagement position and the release position. An electric motor 64 which is a structure element of the drive mechanism 62 is disposed such that a motor rotating shaft becomes approximately parallel in the axial direction of the push rod 22. In the rotating shaft of the motor 64, there is attached a worm 66. A worm wheel 68 engaging the worm 66 is rotatably supported in the second housing 54 such that a rotating shaft thereof intersects in the longitudinal direction of the engagement member 56 and in the axial direction of the push rod 22. Teeth 70 of the worm wheel 68 are formed only in a range of approximately 60 degrees to 90 degrees in a circumferential direction.

There is provided a stopper 72 such that the worm wheel 68 reciprocates the engagement member 56 within a predetermined range without deviating from a range engaging the worm 66. As shown in FIG. 6, the stopper 72 is a component having a rod shape made of the resin material, and is placed such that a center portion thereof is fixed to the rotating shaft of the worm wheel 68 so as to rotate with the worm wheel 68, intersects the rotating shaft thereof, and abuts against an outer face of the second housing 54. On the outer face of the second housing 54 wherein the stopper 72 is attached, there is formed a pair of projecting pieces 74 extending approximately in a fan shape, and the pair of projecting pieces 74 allows the stopper 72 to rotate in a predetermined range, and locks each corresponding end portion of the stopper 72 so as to control the stopper 72 and the worm wheel 68 to rotate beyond an allowable range.

A portion without the teeth 70 in the worm wheel 68, i.e., a lower side portion of the worm wheel 68 shown in FIGS. 7(*a*) and 7(*b*) becomes a cavity sandwiched by a pair of deformed disks 76 forming a side face of the worm wheel 68 to allow the engagement member 56 to pass through. In the pair of deformed disks 76, a diameter of a portion without forming the teeth 70 is shorter compared to that of a portion forming the teeth 70. On inner faces facing each other of the pair of deformed disks 76, there is formed a pair of projections (not shown in the drawings) in such a way as to be received in the through hole 60 of the engagement member 56. The pair of projections moves in an arc shape accompanied by a rotation of the worm wheel 68; however, in order to move the engagement member 56 linearly by the aforementioned movement, the through hole 60 is formed as a long hole extending in an up-and-down direction in FIGS. 7(*a*), 7(*b*), and 7(*c*) so as to absorb a movement of the pair of projections in the up-and-down direction in FIGS. 7(*a*), 7(*b*), and 7(*c*) inside the through hole 60, and transmits a movement in a right-and-left direction in FIGS. 7(*a*), 7(*b*), and 7(*c*) to the engagement member 56.

In the drive unit 26, the through hole 58 allowing the engagement member 56 to protrude and retract faces the first housing 28, and the engagement member 56 is pinched by the pair of pinching pieces 48 of the push lifter unit 24 so as to be inserted into the through hole 60 of the first housing 28. In the pair of pinching pieces 48, there is provided a plurality of shoulder faces 78 intersecting in the axial direction of the push rod 22, and in the second housing 54, there are provided corresponding shoulder faces 80 corresponding to and abutting against each of the shoulder faces 78 of the pair of pinching pieces 48. The shoulder faces 78 and the corresponding shoulder faces 80 work together to function as a guide when the drive unit 26 and the push lifter unit 24 move in a direction of coming close to each other from a direction of intersecting relative to the axial direction so as to easily attach the drive unit 26 to the push lifter unit 24. In the shoulder faces 78 and the corresponding shoulder faces 80, there may be provided projecting pieces and grooves receiving the projecting pieces to enhance a guide function.

Also, after the drive unit 26 is attached to the push lifter unit 24, the shoulder faces 78 and the corresponding shoulder faces 80 lock each other so as to prevent the push lifter unit 24 from deviating in the axial direction of the push rod 22 relative to the drive unit 26 by the push operation relative to the push rod 22.

Also, on a side face of the second housing 54 pinched by the pair of pinching pieces 48, there is provided a plurality of locking claws 82, and in the pair of pinching pieces 48, there is provided a plurality of locking holes 84 locked in the plurality of locking claws 82 in a state wherein the first housing 28 and the second housing 54 come close to each other most so that the engagement member 56 and the through hole 60 are matched. The pinching pieces 48 forming the locking holes 84 are formed by a resin having elasticity. Consequently, if the drive unit 26 and the push lifter unit 24 come close along the shoulder faces 78 and the corresponding shoulder faces 80, portions forming the locking holes 84 are elastically deformed to climb over the locking claws 82, and then return to an original shape, so that the locking claws 82 lock the locking holes 84, and the drive unit 26 is fixed to the push lifter unit 24. Moreover, in order to ensure the fixing, screws (not shown in the drawings) may be screwed into a screw hole 86 provided in the pair of pinching pieces 48 and a screw hole 88 provided in the second housing 54.

Also, in the second housing 54, there is provided a projecting piece 90 on a side opposite to the through hole 58, and the projecting piece 90 includes a screw hole 92, and is used for fixing the drive unit 26 to the opening-portion housing 4 by the screw.

Next, an operation of the fuel lid device 20 will be explained. In the fuel lid device 20, as shown in FIG. 1 and FIG. 2, the push lifter unit 24 can be used independently, and as shown in FIG. 3 and FIG. 4, the push lifter unit 24 and the drive unit 26 can be used in combination as well.

In a case wherein the push lifter unit 24 is used independently, whenever the fuel lid 10 is pushed in, the push operation relative to the push rod 22 is carried out. In FIG. 1, the fuel lid 10 is located in an open position; however, the push rod 22 is located in the retracted position. In a usual operation, such a state does not occur; however, such a state occurs if the push operation relative to the push rod 22 is carried out in a state wherein the fuel lid 10 is located in the open position due to some cause. From such state, when the fuel lid 10 is moved toward the closed position, a direction of the locking piece 36 does not match with a U-shaped opening shape provided in the locked plate 16, and the locked plate 16 contacts the locking piece 36 which is the free end of the push rod 22. From that state, when the fuel lid 10 is pushed in, the push rod 22 is displaced to the protruding position to dispose the fuel lid 10 slightly in an open direction more than the closed position. At that time, the locking piece 36 rotates around the axis line at approximately 90 degrees relative to a time located in the retracted position so as to match with the U-shaped opening shape provided in the locked plate 16, pass through the U-shaped opening, and abut against the back surface of the fuel lid 10.

From that state, when the fuel lid 10 is pushed in once again, the push operation relative to the push rod 22 is carried out, and the push rod 22 is displaced to the retracted position, and the fuel lid 10 is disposed in the closed position. In this operation, the locking piece 36 counter-rotates at approximately 90 degrees around the axis line between the fuel lid 10 and the locked plate 16. Then, since the shape of the locking piece 36 and the U-shaped opening shape of the locked plate 16 do not match in the axial direction, the locking piece 36 locks the locked plate 16 to control the fuel lid 10 from moving in the open direction from the closed position.

From that state, when the fuel lid 10 is pushed in once again furthermore, the push operation relative to the push rod 22 is carried out, and the push rod 22 is displaced to the protruding position to dispose the fuel lid 10 slightly in the open direction more than the closed position. At that time, since the locking piece 36 rotates around the axis line at approximately 90 degrees relative to the time located in the retracted position, the locking piece 36 matches with the U-shaped opening shape provided in the locked plate 16, and the locked plate 16 is not locked in the locking piece 36, so that a user can push the fuel lid 10 to open by hand to move the fuel lid 10 up to the open position.

As shown in FIG. 3 and FIG. 4, in a case wherein the push lifter unit 24 is used in combination with the drive unit 26, even in a case wherein a pushing force acts on the fuel lid 10 located in the closed position unintentionally, the fuel lid 10 can be prevented from moving in the open direction.

FIG. 7(*a*) shows a state wherein the push rod 22 is located in the protruding position, and the engagement member 56 is located in the release position. FIG. 7(*b*) shows a state wherein the push rod 22 is located in the retracted position, and the engagement member 56 is located in the release position. In that state, the fuel lid 10 can be disposed in the closed position, and the locking piece 36 of the push rod 22 locks the locked plate 16 of the fuel lid 10 so as to maintain the fuel lid 10 in the closed position. From that state, when the fuel lid 10 is pushed in, the push rod 22 is displaced to the protruding position, and the fuel lid 10 moves in the open direction.

From the state of FIG. 7(*b*), a user operates a switch provided in a driver's seat and the like to start the motor 64, transmit a rotational force of the motor 64 to the engagement member 56 through the worm 66 and the worm wheel 68, and move the engagement member 56 from the release position to the engagement position so as to move to the state shown in FIG. 7(*c*). At that time, an end portion on a protruding side of the engagement member 56 passes through the through hole 44 of the first housing 28 to engage the concave portion 42 of the push rod 22 in such a way as to be fitted. The engagement member 56 engages the concave portion 42 so as to control the push rod 22 from moving in the axial direction thereof and prevent the push operation from being carried out. Therefore, the fuel lid 10 located in the closed position cannot be pushed in further, and the fuel lid 10 is maintained in the closed position. The fuel lid 10 can be indirectly locked in the closed position only by engaging the engagement member 56 with the push rod 22, so that compared to a case of directly locking the fuel lid 10, strength of members can be lowered and the drive unit 26 can be downsized.

In a case of carrying out a refueling operation and the like, when a user operates the switch provided in the driver's seat and the like in order to release the locking, the motor 64 counter-rotates, and the engagement member 56 moves from the engagement position to the release position so as to release the locking of the fuel lid 10 through the push rod 22.

Incidentally, in place of the push rod 22, an engagement object of the engagement member 56 may be a movable member of the push-push mechanism 30; for example, the rotating cam 34 to control a rotation of the cam 34 in the engagement position.

Thus, in the present embodiment, regardless of whether or not the drive unit 26 is mounted, the common push lifter unit 24 can be used so as to obtain common-utility of components and efficiency of an inventory management. This is because in a mechanism for locking the push rod 22, the concave portion 42 of the push rod 22 and the through hole 44 of the first housing 28, and the engagement member 56 are separated, and the concave portion 42 of the push rod 22 and the through hole 44 of the first housing 28 are disposed in the push lifter unit 24, and the engagement member 56 is disposed in the drive unit 26 so as to form the push lifter unit 24 and the drive unit 26 as separate members.

Also, in the pair of pinching pieces 48 and the second housing 54, there is provided the guide function for combing the push lifter unit 24 and the drive unit 26, so that the push lifter unit 24 and the drive unit 26 can be easily combined such that the through hole 44 of the first housing 28 and the engagement member 56 are matched.

Figure 8:
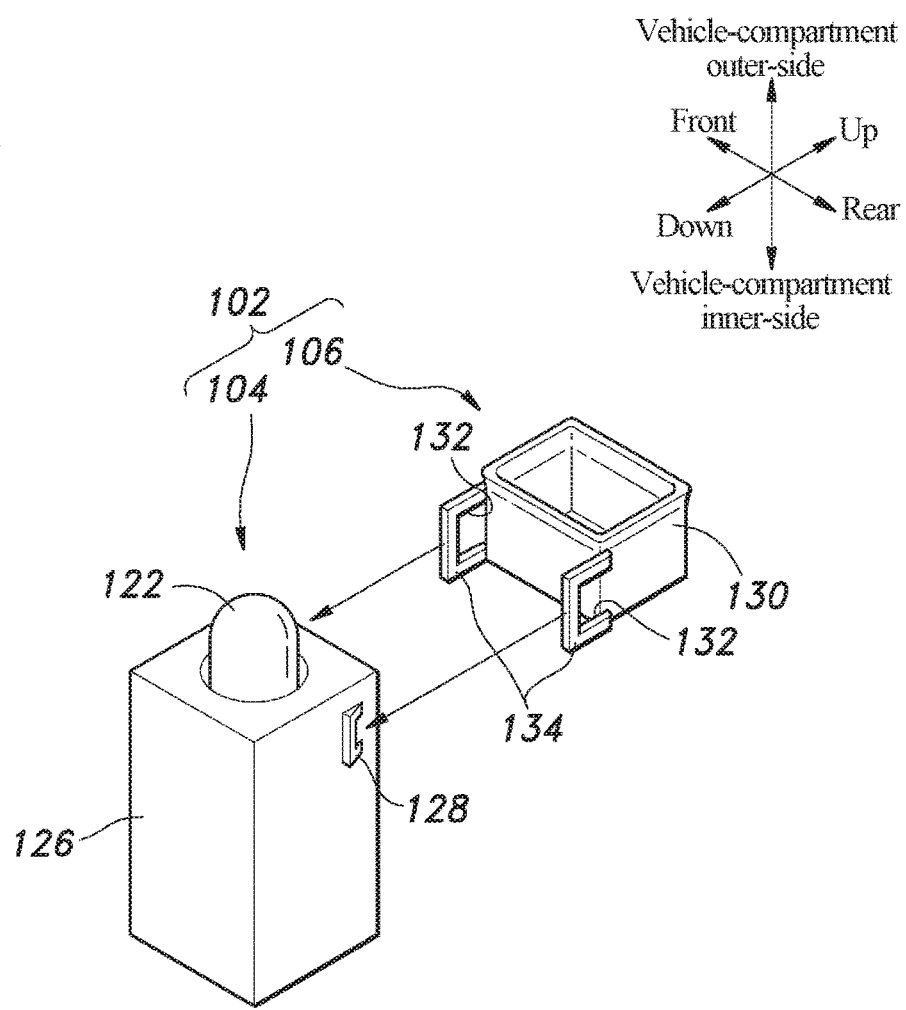
FIG. 8 is a perspective view of the fuel lid device according to a second embodiment of the present invention (a dummy member unit is combined).

Next, a second embodiment according to the present invention will be explained. In an explanation, regarding a structure common to the first embodiment, an explanation thereof is omitted, and the same symbols are assigned. In the second embodiment, a fuel lid device 102 is used as a combination of a push lifter unit 104 and a dummy member unit 106 (FIG. 8) or a drive unit 108 (FIG. 9).

A fuel lid assembly 110 wherein the fuel lid device 102 according to the second embodiment is applied comprises an opening-portion housing 112 and a fuel lid 114 connected to the opening-portion housing 112 through the hinge 12. In the fuel lid 114, there is provided a locked piece 116 protruding from a back surface on a free end side in place of the enlarged portion 14 and the locked plate 16 of the first embodiment, and in the locked piece 116, there is provided a through hole 118 in a direction parallel to a shaft of the hinge 12. In a flange 120 of the opening-portion housing 112, in addition to the through hole 18 inserting the push rod 122 of the push lifter unit 104 to pass through, there is provided a through hole 124 allowing the locked piece 116 to communicate when the fuel lid 10 is located in the closed position. The fuel lid device 102 is fixed to an outer circumferential face of the opening-portion housing 112 by the screw and the like such that the push rod 122 is inserted into the through hole 118. Incidentally, a structure for screwing is omitted in the drawings.

The push lifter unit 104 comprises a first housing 126; the push rod 122 movably supported in the first housing 126; and the push-push mechanism (not shown in the drawings) moving the push rod 122 between the protruding position and the retracted position. In the push-push mechanism, there can be applied a known mechanism. Unlike the first embodiment, the push rod 122 does not rotate around the axis line, and a free end thereof has a hemisphere shape. On two side faces positioned on sides opposite to each other of the first housing 126, there is provided a pair of locking claws 128.

The dummy member unit 106 is a molded article made of the resin material, and comprises a dummy-member main member 130 having a box shape wherein the vehicle compartment outer side is open. On an outer circumference on an opening end side of the dummy-member main member 130, there may be attached a seal member (not shown in the drawings). From the dummy-member main member 130, there protrudes a pair of pinching pieces 134 pinching the first housing 126 and including locking holes 132 so as to be locked in the pair of locking claws 128. The pair of pinching pieces 134 has elasticity, so that when the dummy member unit 106 comes closer to the push lifter unit 104 such that the pair of pinching pieces 134 moves toward the locking claws 128, the pair of pinching pieces 134 is elastically deformed to climb over the locking claws 128, and then return to an original shape so as to be locked in the locking claws 128. Thus, the dummy member unit 106 is fixed to the push lifter unit 104.

The drive unit 108 is a molded article made of the resin material, and comprises a second housing 136 having approximately a box shape. On the vehicle compartment outer side of the second housing 136, there is provided a concave portion 138. An engagement member 140 made of the metal or resin material has a rod shape, and is supported in the second housing 136 retractably in the concave portion 138. The engagement member 140 is disposed in parallel in a through direction of the through hole 118 of the locked piece 116 of the fuel lid 114, moves in an extension direction thereof, and protrudes and retracts from the concave portion 138. Although it is not shown in the drawings, the second housing 136 houses the drive mechanism 62 same as the first embodiment, and the drive mechanism 62 moves the engagement member 140 between an engagement position protruding into the concave portion 138 and a release position retracted into the second housing 136. When the fuel lid 114 is located in the closed position, the locked piece 116 of the fuel lid 114 is received in the concave portion 138. At that time, when the engagement member 140 is moved to the engagement position, the engagement member 140 is inserted into the through hole 118 of the locked piece 116 to engage the locked piece 116 so as to lock the fuel lid 114 at the closed position. Also, when the engagement member 140 is moved to the release position, the engagement member 140 disengages from the through hole 118 of the locked piece 116 to release an engagement with the locked piece 116 so as to release the locking in the closed position of the fuel lid 114.

Also, the drive unit 108 comprises the pair of pinching pieces 134 in the same manner as the dummy member unit 106. Moreover, the drive unit 108 comprises a support plate 142 extending toward a push lifter unit 104 side from the vehicle compartment inner side (a lower side in FIG. 9) of the second housing 136. The drive unit 108 can be attached to the push lifter unit 104 in the same manner as the dummy member unit 106. In an attachment state, the support plate 142 supports the push lifter unit 104 from the vehicle compartment inner side.

Next, an operation of the fuel lid device 102 according to the second embodiment will be explained. The fuel lid device 102 is used in combination with the push lifter unit 104 and the dummy member unit 106 when a function for locking the fuel lid 114 is unnecessary, and is used in combination with the push lifter unit 104 and the drive unit 108 when the function for locking the fuel lid 114 is necessary.

In either case, whenever the fuel lid 114 is pushed in, the push operation relative to the push rod 122 is carried out, and the push rod 122 moves between the retracted position allowing the closed position of the fuel lid 114 and the protruding position wherein the fuel lid 114 is moved in the open direction slightly from the closed position. When the push rod 122 is located in the protruding position, a user can move the fuel lid 114 up to the open position by hand.

In a case of using the push lifter unit 104 and the dummy member unit 106 in combination, in a state wherein the dummy member unit 106 is attached to the push lifter unit 104 such that the pinching pieces 134 of the dummy member unit 106 engage the locking claws 128, the fuel lid device 102 is attached to the opening-portion housing 112 by the screw and the like. Then, the opening end side of the dummy-member main member 130 of the dummy member unit 106 fits in the through hole 124 of the flange 120 fluid-tightly, and the dummy-member main member 130 functions as a seal material preventing rain water and the like from entering from the through hole 124. Also, the dummy-member main member 130 has the box shape wherein the vehicle compartment outer side is open so as to receive the locked piece 116 provided on a back surface side of the fuel lid 114 when the fuel lid 114 is located in the closed position, so that the fuel lid 114 cannot be prevented from moving to the closed position. Consequently, the fuel lid 114 and opening-portion housing 112 same as a case of using the drive unit 108 can be used, and an operation of closing the through hole 124 can be integrated with an attachment process of the fuel lid device 102 so as to reduce the number of operations.

In a case of using the push lifter unit 104 and the drive unit 108 in combination, in a state wherein the drive unit 108 is attached to the push lifter unit 104 such that the pinching pieces 134 of the drive unit 108 engage the locking claws 128, the fuel lid device 102 is attached to the opening-portion housing 112 by the screw and the like. Then, the concave portion 138 of the second housing 136 is disposed in such a way as to match with the through hole 124 of the flange 120, and when the fuel lid 114 is located in the closed position, the locked piece 116 is received in the concave portion 138. When the fuel lid 114 is located in the closed position, a user operates the switch provided in the driver's seat and the like to actuate the drive mechanism 62 so as to move the engagement member 140 to the engagement position. Then, the engagement member 140 is inserted to pass through the through hole 118 of the locked piece 116 of the fuel lid 114 to lock the locked piece 116, so that the fuel lid 114 is locked at the closed position. For example, even if the fuel lid 114 is unintentionally pushed in, and an urging force acts on the push rod 122 toward the protruding position, the fuel lid 114 is locked in the engagement member 140 so as to be maintained in the closed position. In the case of carrying out the refueling operation and the like, a user operates the switch provided in the driver's seat and the like to actuate the drive mechanism 62 in an opposite direction, move the engagement member 140 to the release position, and release an engagement between the engagement member 140 and the locked piece 116 so as to release the locking at the closed position of the fuel lid 114.

Thus, regardless of whether or not the fuel lid 114 has a lock function, the common push lifter unit 104 can be used. Also, even in a case wherein the fuel lid 114 does not have the lock function, the dummy member unit 106 receives the locked piece 116 having a structure for locking provided in the fuel lid 114, and can close the through hole 124 into which the locked piece 116 is inserted to be sealed, so that there is no need for changing the structures of the opening-portion housing 112 itself and the fuel lid 114 itself.

The specific embodiments have been explained hereinabove; however, the present invention is not limited to the embodiments described hereinabove, and can be modified widely. For example, the lid device of the present invention can be applied to a lid pivotally supported turnably other than the fuel lid 10. In the first embodiment, the engagement member 56 and the concave portion 42 may be formed such that an engagement of both portions does not control the push operation relative to the push rod 22, and controls a movement toward the protruding position from the retracted position. In the second embodiment, there may be provided an engagement structure of urging the fuel lid 114 toward the closed position by a spring, a magnet, or the like by a force weaker than an urging force of the compression coil spring 32 of the push-push mechanism 30, or releasably engaging the fuel lid 114 and the opening-portion housing 112. Thereby, even in a case of using the dummy member unit 106, when the push rod is located in the retracted position, the fuel lid 114 can be maintained in the closed position. Also, the locking holes locked in the locking claws may be concave portions. Also, the pair of pinching pieces provided in one housing, and the locking claws provided in the other housing to lock the pinching pieces may be provided in the opposite housing respectively, and the locking claws may be provided in the pinching pieces of one housing, and the locking holes locked in the locking claws or the concave portions may be provided in the other housing.

EXPLANATION OF SYMBOLS

2 and 110 . . . a fuel lid assembly, 4 and 112 . . . an opening-portion housing, 6 and 120 . . . a flange, 8 . . . a fuel filling opening, 10 and 114 . . . a fuel lid, 12 . . . a hinge, 16 . . . a locked plate, 20 and 102 . . . a fuel lid device, 22 and 122 . . . a push rod, 24 and 104 . . . a push lifter unit, 26 and 106 . . . a drive unit, 28 and 126 . . . a first housing, 30 . . . a push-push mechanism, 34 . . . a cam, 36 . . . a locking piece, 38 . . . a projection, 40 . . . a long hole, 42 . . . a concave portion, 48 . . . a pair of pinching pieces, 54 and 136 . . . a second housing, 56 and 140 . . . an engagement member, 62 . . . a drive mechanism, 82 . . . locking claws, 84 . . . locking holes

What is claimed is:

1. A lid device for pushing a lid, pivotally supported in a base member turnably between an open position and a closed position for opening and closing an opening provided in the base member, out in an open direction from the closed position, comprising:
    a push lifter unit including
        a first housing provided on a base member side,
        a push rod supported movably in an axial direction by the first housing, and
        a push-push mechanism housed inside the first housing, and alternately displacing between a protruding position and a retracted position whenever a push operation is carried out relative to the push rod; and
    a drive unit including
        a second housing provided on the base member side,
        an engagement member movably supported in the second housing in such a way as to selectively engage the push rod or the push-push mechanism in order to prevent the push rod from moving in the axial direction at the closed position, and
        a drive mechanism housed inside the second housing, for driving the engagement member between an engagement position and a release position,
    wherein the push lifter unit and the drive unit are formed as separate members from each other, so that locking the lid at the closed position is selected depending on a presence of the drive unit.

2. A lid device according to claim 1, wherein the engagement member engages a corresponding rod engagement portion provided in the push rod at the engagement position.

3. A lid device according to claim 1, wherein the engagement member engages a cam of the push-push mechanism at the engagement position.

4. A lid device according to claim 1, wherein housings of the first housing and the second housing include an attachment structure for fixing each other.

5. A lid device according to claim 4, wherein the attachment structure includes a locking claw provided in one of the housings, and a locked portion provided in the other of the housings and locked in the locking claw.

6. A lid device according to claim 4, wherein the attachment structure comprises
a pair of pinching pieces provided in one of the housings in such a way as to pinch the other of the housings; and
a guide structure provided between the pair of pinching pieces and corresponding portions of the other of the housings in such a way as to guide the housings toward each other, and the housings are locked at an attachment position wherein the housings are close to each other most.

7. A lid device according to claim 1, wherein a free end of the push rod includes an engagement piece which engages a corresponding lid engagement portion on a lid side at the retracted position, and disengages from the corresponding lid engagement portion on the lid side at the protruding position, and
in order to carry out an engagement or disengagement of the engagement piece and the corresponding lid engagement portion, the push-push mechanism is formed in such a way as to displace the push rod between the protruding position and the retracted position, and simultaneously rotate the push rod around the axial direction.

8. A lid device according to claim 1, wherein the first housing comprises a first through hole for passing through the engagement member, and the second housing includes a second through hole for protruding the engagement member from the second housing, and
when the first housing and the second housing are locked to each other and the engagement member is in the engagement position, the engagement member protrudes through the first through hole and the second through hole to engage the push rod.

9. A lid device according to claim 8, wherein the drive unit further comprises
a worm attached to a shaft of the drive mechanism and extending in parallel to the axial direction of the push rod,
a worm wheel having a rotating shaft to be rotatably supported in the second housing and connecting the worm and the engagement member, and
a stopper having a rod shaped component coaxially connected to the worm wheel through the rotating shaft and arranged to rotate outside of the second housing, and
the second housing includes a pair of projecting pieces disposed on an outer face of the second housing and spaced apart from each other to arrange the rod shaped component therebetween, the pair of projecting pieces being arranged to contact the rod shaped component and stop the worm wheel from rotating beyond the rotational range.

10. A lid device for pushing a lid, pivotally supported in a base member turnably between an open position and a closed position for opening and closing an opening provided in the base member, out in an open direction from the closed position, comprising:
a push lifter unit including
a first housing provided on a base member side,
a push rod supported movably in an axial direction by the first housing, and
a push-push mechanism housed inside the first housing and alternately displacing between a protruding position and a retracted position whenever a push operation is carried out relative to the push rod; and
a drive unit including
a second housing attached to the push lifter unit,
an engagement member movably supported in the second housing in such a way as to selectively engage a corresponding lid engagement portion on a lid side passing through a through hole provided in the base member at the closed position, and
a drive mechanism housed inside the second housing, for driving the engagement member between an engagement position and a release position,
wherein the push lifter unit and the drive unit are formed as separate members from each other, so that locking the lid at the closed position is selected depending on a presence of the drive unit.

11. A lid device according to claim 10, further comprising a dummy member unit formed as a separate member relative to the push lifter unit in place of the drive unit, receiving the corresponding lid engagement portion passing through the through hole at the closed position, and attached to the push lifter unit in such a way as to close the through hole fluid-tightly.

* * * * *